(12) United States Patent
Gschwind, Jr.

(10) Patent No.: US 9,788,673 B2
(45) Date of Patent: Oct. 17, 2017

(54) STEMMED DRINKING RECEPTACLE HOLDER

(71) Applicant: John Gschwind, Jr., Chicago, IL (US)

(72) Inventor: John Gschwind, Jr., Chicago, IL (US)

( * ) Notice: Subject to any disclaimer, the term of this patent is extended or adjusted under 35 U.S.C. 154(b) by 0 days.

(21) Appl. No.: 14/632,934

(22) Filed: Feb. 26, 2015

(65) Prior Publication Data

US 2015/0305534 A1   Oct. 29, 2015

Related U.S. Application Data

(60) Provisional application No. 61/945,531, filed on Feb. 27, 2014.

(51) Int. Cl.
*A47G 23/02* (2006.01)
*F16B 2/10* (2006.01)

(52) U.S. Cl.
CPC ............ *A47G 23/0225* (2013.01); *F16B 2/10* (2013.01)

(58) Field of Classification Search
CPC ............ A47G 23/0225; A47G 23/0208; A47G 23/0216; F16B 2/10
USPC ...... 248/311.2, 689, 229.13, 229.23, 231.51, 248/227.1, 312
See application file for complete search history.

(56) References Cited

U.S. PATENT DOCUMENTS

| | | | |
|---|---|---|---|
| 936,104 A * | 10/1909 | Ernest | B60J 3/0217 131/241 |
| 1,288,560 A * | 12/1918 | Gordon | F16M 13/02 108/27 |
| D87,682 S | 12/1932 | Porter | |
| 2,602,310 A | 7/1952 | Hansen | |
| D203,055 S * | 11/1965 | Robinson | D7/620 |
| 4,084,778 A * | 4/1978 | Dominguez | G10G 5/00 248/300 |
| D281,565 S | 12/1985 | Stourton et al. | |
| D283,032 S * | 3/1986 | Quesnel | D17/20 |
| 4,749,112 A | 6/1988 | Harper | |
| 4,887,784 A | 12/1989 | Kayali | |
| D308,461 S * | 6/1990 | Hosea | A47G 19/06 D7/507 |
| 4,961,555 A * | 10/1990 | Egan, Jr. | A47G 23/0225 211/41.2 |
| 5,014,956 A * | 5/1991 | Kayali | B60N 3/102 248/311.2 |
| 5,188,327 A * | 2/1993 | White | F16B 12/54 248/231.81 |
| 5,294,000 A * | 3/1994 | Yanuzzi | A47G 19/065 206/519 |
| 5,390,798 A * | 2/1995 | Yanuzzi | A47G 19/065 206/519 |
| 5,853,158 A * | 12/1998 | Riggle | A47G 23/0225 248/103 |

(Continued)

*Primary Examiner* — Ingrid M Weinhold
(74) *Attorney, Agent, or Firm* — David A. Gottardo, Attorney at Law

(57) ABSTRACT

This invention relates generally to a stemmed drinking receptacle holder, and more particularly to a holder utilizing a bore and channel configuration to prevent the receptacle from being dislodged therefrom. In one embodiment, the holder comprises a bracket defining a through bore configured to encircle a stem of the stemmed drinking receptacle, a channel defined in the bracket and connecting the through bore with an outer edge of the bracket, and a clamp adjustably connected to the bracket.

15 Claims, 3 Drawing Sheets

(56) References Cited

U.S. PATENT DOCUMENTS

| | | |
|---|---|---|
| 5,996,957 A | 12/1999 | Kurtz |
| 6,059,138 A * | 5/2000 | Labruyere .......... A47G 23/0225 220/23.4 |
| D444,706 S * | 7/2001 | Giancaspro ..................... D3/229 |
| D449,206 S * | 10/2001 | DuBow ....................... D7/708.1 |
| D453,891 S * | 2/2002 | Sussman ...................... D7/553.1 |
| 6,394,285 B1 | 5/2002 | Arthurs et al. |
| 6,601,813 B1 | 8/2003 | Kager et al. |
| 7,284,737 B2 | 10/2007 | Kane |
| D575,600 S * | 8/2008 | Mayer ......................... D7/553.1 |
| 7,458,471 B2 | 12/2008 | Crudgington, Jr. |
| D600,077 S * | 9/2009 | Barnes, Jr. ...................... D7/620 |
| D612,691 S * | 3/2010 | Barnes, Jr. ...................... D7/620 |
| D614,926 S * | 5/2010 | Cox ................................ D7/708 |
| D623,478 S * | 9/2010 | Hayashi ...................... D7/551.1 |
| D625,958 S * | 10/2010 | Deming ....................... D7/553.6 |
| 7,959,121 B1 * | 6/2011 | Barnes, Jr. ......... A47G 23/0225 224/148.4 |
| 8,231,094 B1 * | 7/2012 | Barnes, Jr. ......... A47G 23/0225 224/148.4 |
| D691,432 S * | 10/2013 | Chiorazzi ....................... D7/708 |
| D717,132 S * | 11/2014 | Van Dyke ...................... D7/708 |
| 9,016,510 B2 * | 4/2015 | Edwards ................. B60N 3/106 220/574.1 |
| D750,444 S * | 3/2016 | Smith ......................... D7/619.1 |
| D750,445 S * | 3/2016 | Smith ......................... D7/619.1 |
| 2004/0140411 A1 | 7/2004 | Roe et al. |
| 2007/0045496 A1 * | 3/2007 | Kane ................... A47G 23/0225 248/313 |
| 2009/0121107 A1 * | 5/2009 | Lagobi ............... A47G 23/0225 248/311.2 |
| 2011/0121619 A1 * | 5/2011 | Chappell .................... A47C 7/62 297/188.01 |
| 2012/0305716 A1 * | 12/2012 | McKay ............. A47G 23/0225 248/146 |
| 2013/0105650 A1 | 5/2013 | Cohen |
| 2014/0284443 A1 * | 9/2014 | Forbes .................... G09F 21/04 248/313 |

\* cited by examiner

STEMMED DRINKING RECEPTACLE HOLDER

CROSS REFERENCE TO RELATED APPLICATIONS

This application claims priority to U.S. Provisional Application Ser. No. 61/945,531 filed on Feb. 27, 2014.

TECHNICAL FIELD OF THE INVENTION

This invention relates generally to a stemmed drinking receptacle holder, and more particularly to a holder utilizing a bore and channel configuration to prevent the receptacle from being dislodged therefrom.

BACKGROUND OF THE INVENTION

At times, such as during picnics or other outings where table top surfaces may be unavailable, setting down a wine glass or other stemmed drinking receptacle may be difficult due to a risk of spilling the receptacle's contents. For example, if sitting in a lawn chair at an outdoor concert, one would typically have to constantly hold the wine glass in one's hand because no adequate table surface or other flat surface is available on which to place the glass.

While prior art drinking receptacle holders exist, such prior art holders are fraught with disadvantages. For example, numerous prior art drinking receptacle holders support the drinking receptacle at its base. However, because stemmed drinking receptacles tend to be "top heavy," such base-supporting holders are ill-suited for supporting a stemmed drinking receptacle without a risk or tipping. While base-supporting drinking receptacles may also include one or more supports for supporting the bowl of a stemmed drinking receptacle, such holders tend to be cumbersome to use and transport.

Thus, what is needed is a stemmed drinking receptacle holder that supports the drinking receptacle at its bowl. The holder should secure the receptacle therein to prevent it from being dislodged from the holder, and be removably securable to other objects. The holder should also be easy to use and transport. The present invention solves the forgoing problems and provides other advantages as well.

SUMMARY OF THE INVENTION

This invention relates generally to a stemmed drinking receptacle holder, and more particularly to a holder utilizing a bore and channel configuration to prevent the receptacle from being dislodged therefrom. In one embodiment, the holder comprises a bracket defining a through bore configured to encircle a stem of the stemmed drinking receptacle, a channel defined in the bracket and connecting the through bore with an outer edge of the bracket, and a clamp adjustably connected to the bracket. The channel preferably defines a bore opening where the channel meets the bore and an edge opening where the channel meets the outer edge, with the bore opening preferably oriented about perpendicular to the edge opening. The bracket preferably defines at least side outer edges, with the edge opening defined in one of the side outer edges. The through bore defines a circumferal edge, with the bore opening preferably defined in a forward portion of the circumferal edge. In other embodiments, the bore of the bracket defines an angled inner wall configured to seat the bowl of the stemmed drinking receptacle.

The bracket preferably defines forward and rearward edges wherein the forward, rearward and side edges of the bracket define a rectangle, oval or other shape. The adjustable connection between the clamp and handle preferably comprises a frictional and rotational connection that facilitates a folding of the holder such that the bracket is positioned about adjacent to or about in face-to-face relation, and minimally displaced from, with the clamp to optimize the holder's portability.

DESCRIPTION OF THE EMBODIMENTS

Figure 1:
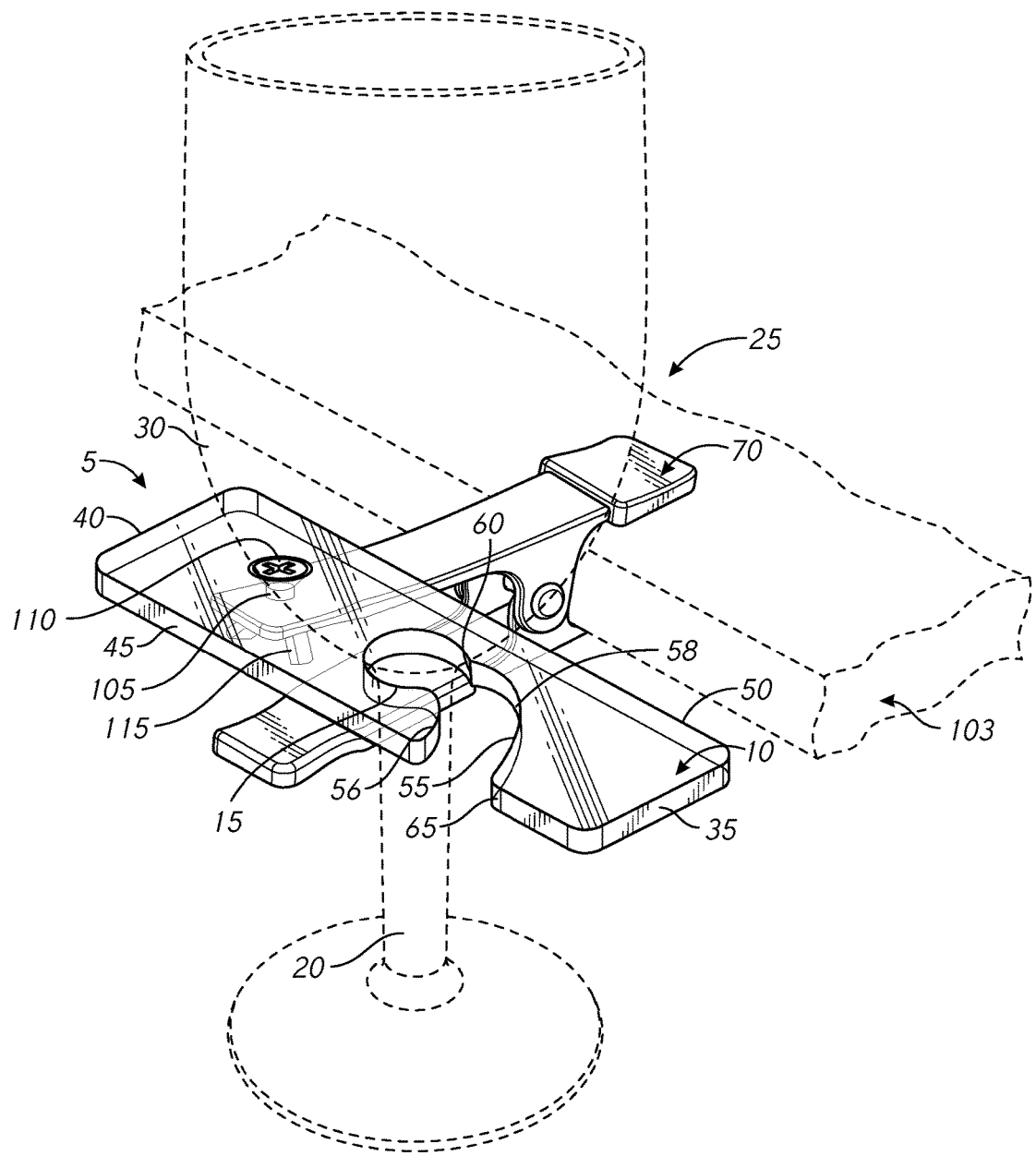
FIG. 1 illustrates one embodiment of the stemmed drinking receptacle holder holding a stemmed drinking receptacle.

This invention relates generally to a stemmed drinking receptacle holder, and more particularly to a holder utilizing a bore and channel configuration to prevent the receptacle from being dislodged therefrom. In one embodiment of the invention, illustrated in FIGS. 1, 2 and 4, the stemmed drinking receptacle holder 5 comprises a bracket 10 defining a through bore 15 configured to encircle the stem 20 of a stemmed drinking receptacle 25 such that the bracket supports the drinking receptacle's bowl 30. The bracket 10, preferably elongated, preferably comprises a piece of rigid sheet-form material defining forward 35, rearward 40 and side outer edges 45 and 50. Of course, it is understood that non-sheet-form material could be utilized as well.

In a preferred embodiment, the forward, rearward and side edges of the bracket define a rectangle having a length of between about 4.0 in. and about 7.0 in., preferably between about 5.0 in. and about 6.0 in., and optimally about 5.5 in.; and a width of between about 1.0 in. and about 2.0 in., preferably between about 1.25 in. and about 1.5 in., and optimally about 1.25 in. The bracket has a thickness of between about 0.125 in. and about 0.75 in., preferably between about 0.25 in. and about 0.5 in., and optimally about 0.25 in, or 0.5 in. In other embodiments, the forward, rearward and side edges of the bracket define an oval or other geometrical shape as well.

The rigid sheet-form material preferably comprises translucent or non-translucent polycarbonate (i.e., Lexan®), polymethyl methacrylate (i.e., Plexiglas®) or other thermoplast or plastic materials understood in the art as having rigid properties. FIGS. 1-4 thus illustrate a bracket 10 comprising translucent polycarbonate or polymethyl methacrylate. However, in other embodiments, the bracket 10 is comprised of steel, aluminum or other metals, or of wood. A channel 55, having a width exceeding that of the drinking receptacle's stem 20, connects the through bore 15 with a side outer edge (45 or 50) of the bracket 10, with the channel defining a bore opening 60 where the channel meets the bore and an edge opening 65 where the channel meets and is coterminous with the bracket's outer edge.

The channel 55 preferably defines a pair of arcuate inner edges 56 and 58. However, in other embodiments (not illustrated) of the channel 55, the inner edges 56 and 58 are straight. The channel 55 has a length of between about 0.5 in. and about 2.0 in., preferably between about 1.0 in. and about 1.5 in., and optimally about 1.25 in. In a preferred embodiment of the invention, the bore opening 60 defined by the channel has a chordal width that is less than the diameter of the through bore 15. A clamp 70 is adjustably connected to the bracket 10 such that the holder 5 is removably securable to other objects (i.e., object 103).

Referring again to FIG. 2, the channel 55 further defines a curved path between the bore opening 60 and edge opening 65, with the curved path between the bore and edge openings preferably approximating a right angle. Thus, the bore opening 60 is preferably oriented about perpendicular to the edge opening 65. The edge opening 65 is preferably defined in one of the bracket's side outer edges 45 or 50 while the bore opening 60 is preferably defined in a forward portion 75 of a circumferal edge 80 defined by the through bore 15. However, it is understood that the bore opening could be defined in a rearward portion 85 of the through bore's circumferal edge 80. It is further understood that the edge opening 65 could be defined in the forward 35 or rearward 40 edge of the bracket 10, with the bore edge 60 defined in a side portion 90 of the through bore's circumferal edge 80 as well.

The foregoing configuration better prevents the receptacle from falling from the holder than in a configuration where the channel joins the bore at an opening that is parallel with the opening where the channel joins the edge (i.e., a straight channel connecting the side edge of the bore with the side edge of the holding portion). In the latter configuration, a sideways bump of the glass could more easily dislodge the glass from the holder than in the former configuration.

Figure 2:
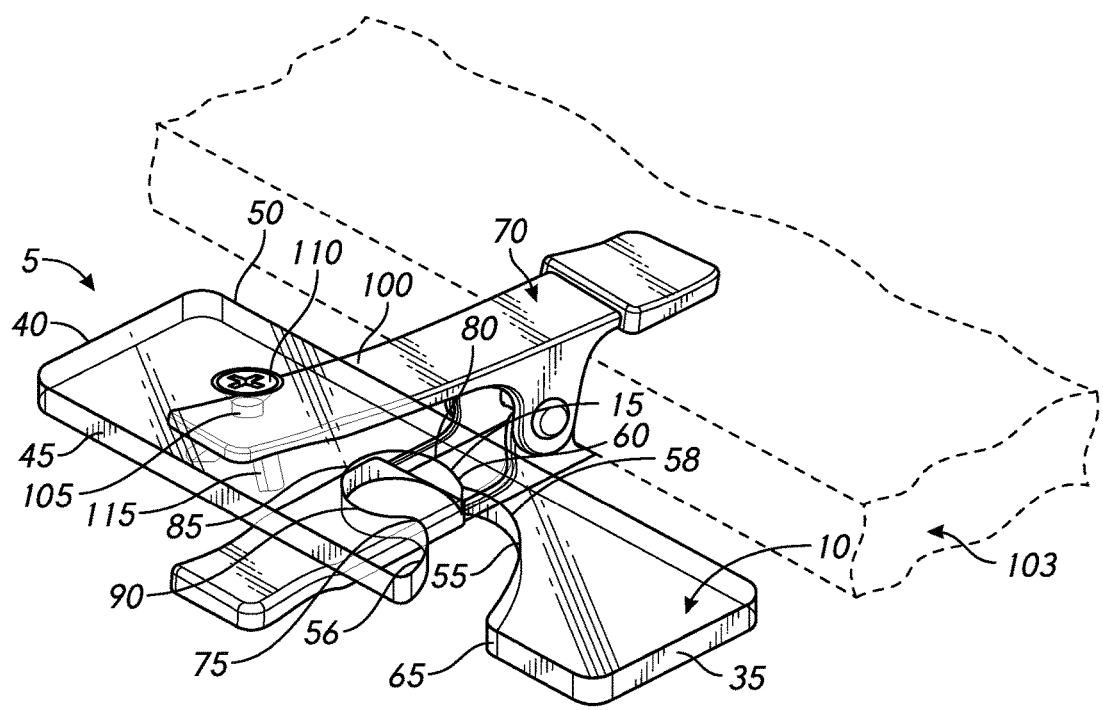
FIG. 2 illustrates the stemmed drinking receptacle holder of FIG. 1.
Figure 3:
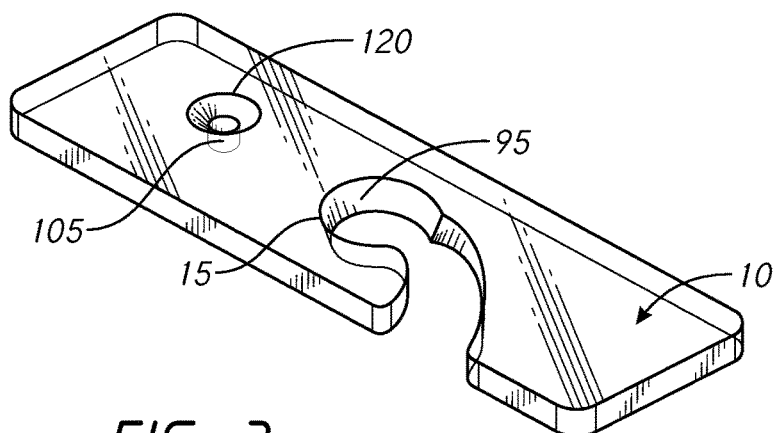
FIG. 3 illustrates an alternate embodiment of the bracket of the stemmed drinking receptacle holder of FIGS. 1 and 2.

In other embodiments of the invention, as illustrated in FIG. 3, the through bore 15 of the bracket 10 defines a tapered or angled inner wall 95 such that the wall better conforms to an angle of the bowl 30 of the stemmed drinking receptacle 25 (FIG. 1). The angle of the bore's wall is between about 15 degrees and about 90 degrees from the horizontal, more preferably between about 30 degrees and about 60 degrees from the horizontal, and optimally about 45 degrees from the horizontal.

Figure 4:
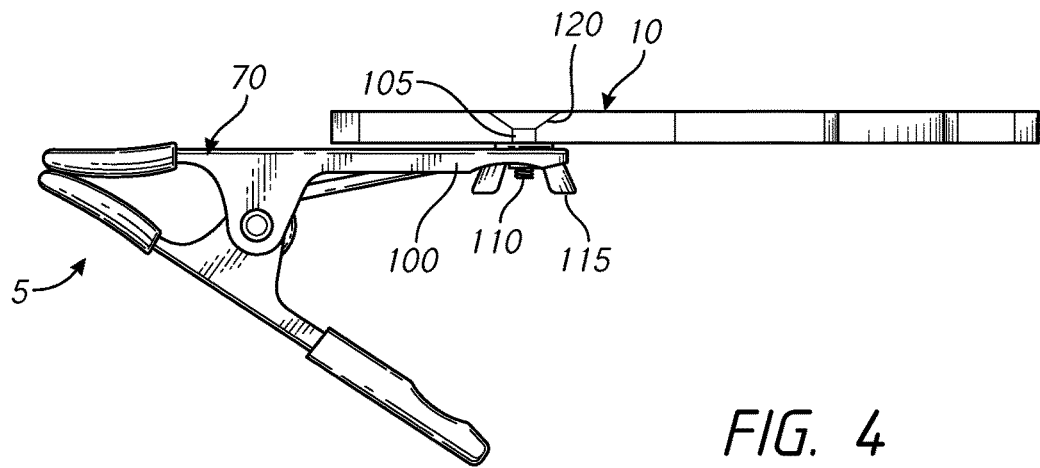
FIG. 4 is a side elevation view of the stemmed drinking receptacle holder of FIGS. 1 and 2.
Figure 5:
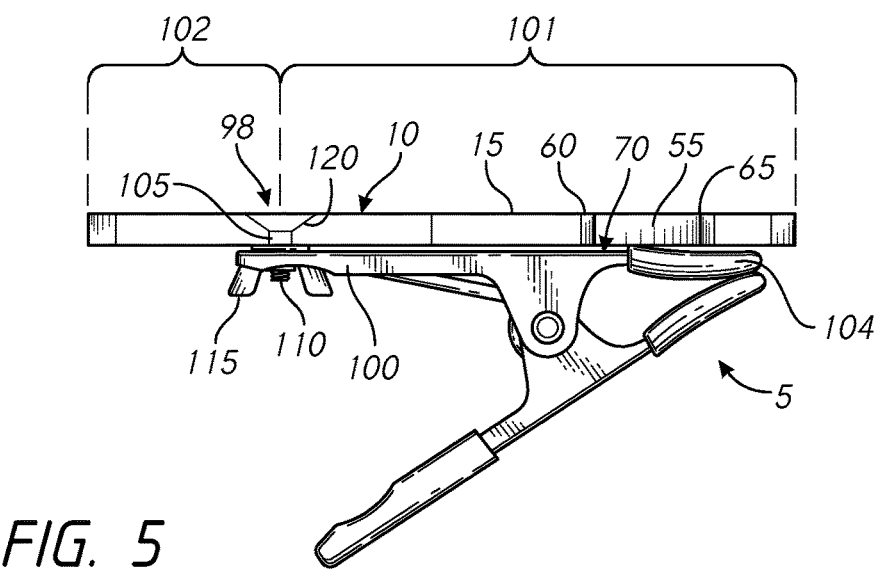
FIG. 5 is the side elevation of FIG. 4 illustrating the clamp rotated 180 degrees in relation to the bracket.

Referring again to FIGS. 1, 2 and also to FIGS. 4 and 5, a common spring clamp 70 or spring-biased "squeeze" clamp is rotatably connected to the bracket 10 via rotatable connection 98, preferably connecting a handle 100 of the spring clamp to the bracket at a location rearward of the bore 15 and channel 55. The location of the rotatable connection 98 in relation the bracket 10 thus defines forward and rearward portions 101 and 102 of the bracket. The rotatable connection is frictionally adjustable to allow the bracket 10 to be frictionally and rotationally positioned 360 degrees in relation to the clamp 70 to facilitate a positioning of the bracket regardless of the location of the clamp when clamped to another object 103, (i.e., the arm-rest of a lawn chair). The rotatable connection also facilitates a "folding" of the holder such that the bracket, namely, the forward portion 101 (FIG. 5), is positioned about adjacent to or about in face-to-face relation with, and minimally displaced from, both the clamp's handle 100 and jaw 104 to optimize the holder's portability. When in this folded position, the channel 55 is positioned about adjacent or next to the clamp's jaw 104 as well.

A coaxial connector bore 105 (FIGS. 3 and 4) is thus defined in both the clamp 70 and bracket 10 such that a common screw 110 is inserted there-through and secured with a wing-nut 115. The wing-nut 115 is rotated onto the screw 110 to a desired tightness to create friction between the bracket 10 and clamp 70 to facilitate the frictional rotation between the two. While a screw and wing-nut is preferably utilized to frictionally and rotationally connect the bracket and clamp to one another, any other connecting means understood in the art (i.e., nut/bolt; or rivet, etc.) may be utilized as well. It is thus understood that the countersink 120 (FIGS. 3 and 4) defined within the bracket 10 at the top of bore 105 could have a different shape (i.e., other than angled to conform to the head of screw 110), or be eliminated altogether. Also, any other clamping means understood in the art (i.e., a C-clamp) may be utilized in place of the disclosed spring clamp as well. Furthermore, while a frictional and rotational connection is utilized between the clamp and bracket in the preferred embodiment of the invention, it is understood that the bracket and clamp may be fixably attached to one another as well.

While this foregoing description and accompanying drawings are illustrative of the present invention, other variations in structure and method are possible without departing from the invention's spirit and scope.

I claim:

1. A holder for a stemmed drinking receptacle comprising:
   a bracket defining a rectangle having forward and rearward outer edges, and opposing side outer edges, the opposing side outer edges extending in a longitudinal direction of the bracket, the bracket further defining a through bore configured to encircle a stem of the stemmed drinking receptacle;
   a channel defined in the bracket and connecting the through bore with one of the side outer edges of the rectangle, the channel defining a bore opening where the channel meets the bore and an edge opening where the channel meets said one of the side outer edges, the bore opening oriented about perpendicular to the edge opening; and
   a spring clamp defining a handle and a jaw, the bracket rotatably and frictionally connected to a free end of the handle by a rotatable connection, the bracket defining a forward portion between the forward outer edge and the rotatable connection, the channel and through bore defined in the forward portion, the forward portion rotatable to at least a position about in face-to-face relation with both the handle and jaw wherein the edge opening lies directly above the law, to optimize the holder's portability.

2. The holder of claim 1 wherein the through bore defines a circumferal edge, said bore opening defined in a forward portion of the circumferal edge.

3. The holder of claim 2 wherein the rectangle defines a length of between about 4.0 in. and about 7.0 in and a width of between about 1.0 in. and about 2.0 in.

4. The holder of claim 2 wherein the rectangle defines a length of between about 5.0 in. and about 6.0 in and a width of between about 1.25 in. and about 1.5 in.

5. The holder of claim 2 wherein the rectangle defines a length of about 5.5 in and a width of between about 1.25 in.

6. The holder of claim 2 wherein the bracket has a thickness of between about 0.125 in. and about 0.75 in.

7. The holder of claim 2 wherein the bracket has a thickness of between about 0.25 in. and about 0.5 in.

8. The holder of claim 2 wherein the bracket has a thickness of about 0.25 in.

9. The holder of claim 2 wherein the bracket has a thickness of about 0.5 in.

10. The holder of claim 2 wherein the bore of the bracket defines an angled inner wall.

11. The holder of claim 10 wherein the angled inner wall is between about 15 degrees and about 90 degrees from the horizontal.

12. The holder of claim 10 wherein the angled inner wall is between about 30 degrees and about 60 degrees from the horizontal.

13. The holder of claim 10 wherein the angled inner wall is about 45 degree from the horizontal.

14. The holder of claim 1 wherein the adjustable connection comprises a frictional and rotational connection.

15. The holder of claim 14 wherein the adjustable connection comprises a screw and wing nut.

* * * * *